US008284935B2

(12) United States Patent
Thiruvengadam

(10) Patent No.: US 8,284,935 B2
(45) Date of Patent: Oct. 9, 2012

(54) METHOD, DEVICES AND COMPUTER PROGRAM PRODUCT FOR ENCODING AND DECODING MEDIA DATA

(75) Inventor: Srinath Thiruvengadam, Donauwörth (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 891 days.

(21) Appl. No.: 12/297,993

(22) PCT Filed: Mar. 21, 2007

(86) PCT No.: PCT/EP2007/052683
§ 371 (c)(1),
(2), (4) Date: Mar. 2, 2009

(87) PCT Pub. No.: WO2007/122046
PCT Pub. Date: Nov. 1, 2007

(65) Prior Publication Data
US 2009/0319770 A1 Dec. 24, 2009

(30) Foreign Application Priority Data

Apr. 21, 2006 (DE) .......................... 10 2006 018 645

(51) Int. Cl.
*H04N 7/00* (2011.01)

(52) U.S. Cl. .......... 380/200; 713/168; 725/31; 725/105; 380/37; 380/44; 348/731

(58) Field of Classification Search .................. 713/150, 713/153, 162, 168; 705/50–52; 709/217, 709/229, 225; 380/37, 44, 200–202, 205, 380/209, 210, 232, 237, 225, 259, 260, 264, 380/268, 270, 277–279, 282; 725/31, 100, 725/105; 348/731
See application file for complete search history.

(56) References Cited

U.S. PATENT DOCUMENTS 5,751,805 A 5/1998 Otsuki et al.

7,426,637 B2 * 9/2008 Risan et al. ................... 713/165
(Continued)

FOREIGN PATENT DOCUMENTS

DE 10307403 9/2004
(Continued)

OTHER PUBLICATIONS

M. Baugher et al., The Secure Real-time Transport Protocal (SRTP), Network Working Group, Request for Comments: 3711, Mar. 2004.
3GPP TS 33.203 V6.9.0 (Dec. 2005), Technical Specification Group Services and System Aspects; 3G Security; Access security for IP-based services (Release 6).

(Continued)

*Primary Examiner* — Kim Vu
*Assistant Examiner* — Sayed Beheshti Shirazi
(74) *Attorney, Agent, or Firm* — Laurence A. Greenberg; Werner H. Stemer; Ralph E. Locher

(57) ABSTRACT

The invention relates to methods for encoding and decoding media data (MD, CMD). One of the methods comprises the following steps: A request is transmitted by a subscriber terminal (1) over a control network (2) to a control server (3) to establish a set of encoding parameters (K) for control data. The request includes identification data (ID) of the subscriber terminal (1). The control server (3) thereupon specifies the set of encoding parameters (K) for control data, comprising a random number (R), a control data key (CK) and an integrity key (IK), wherein the control data key (CK) and the integrity key (IK) are dependent on the random number (R) and the identification data (ID). A media key (MK) dependent on the control data key (CK) and on the integrity key (IK) is then generated by the control server (3) and transmitted over a core network (4) to a media server (5). The media key (MK) is used to encode and decode the media data (MD, CMD) subsequently transmitted over a media network (6). The invention also relates to a subscriber terminal (1), a control server (3), and a computer program product that are suitable for implementing the method.

9 Claims, 2 Drawing Sheets

U.S. PATENT DOCUMENTS

Figure 1:
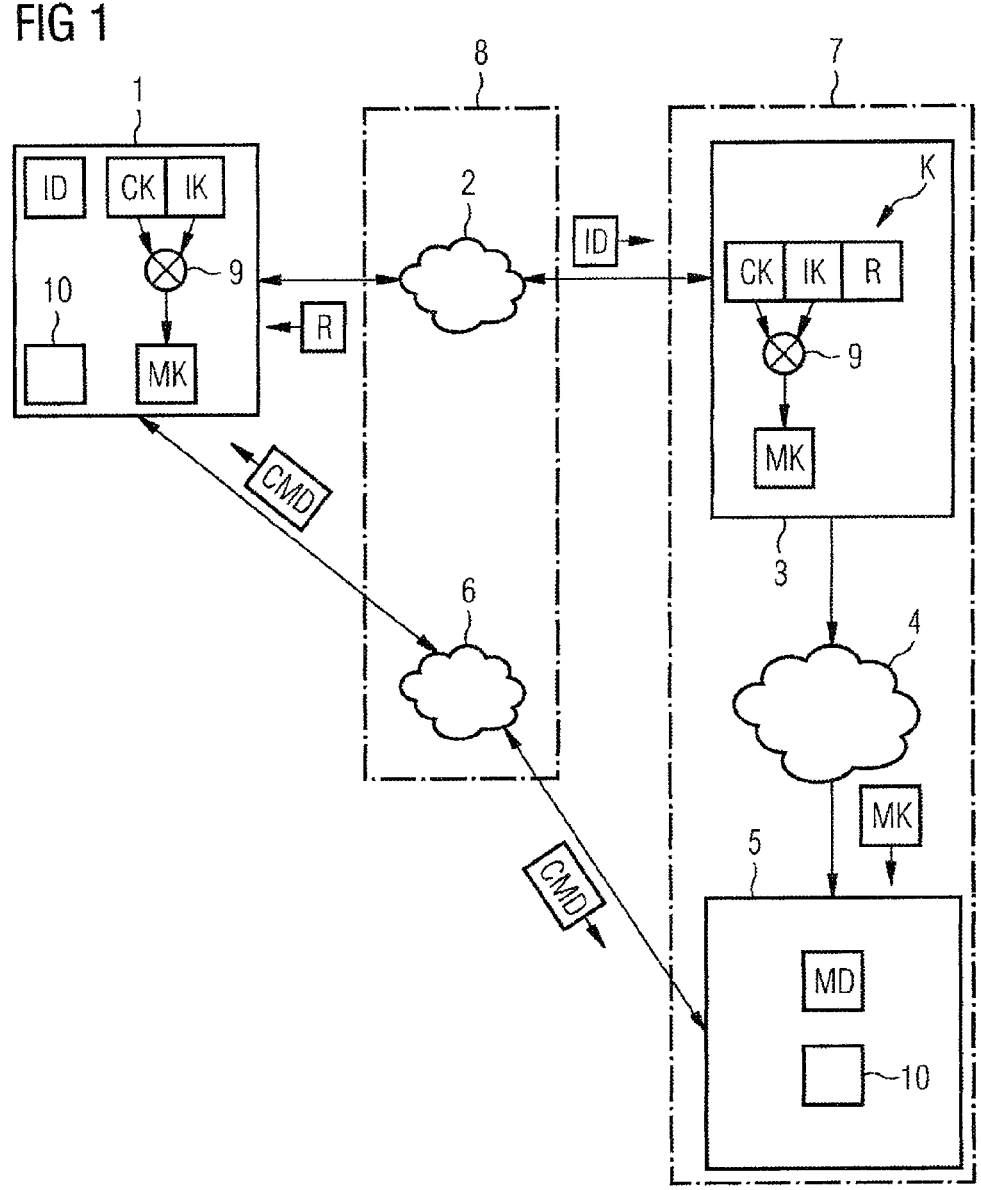

| | | | |
|---|---|---|---|
| 7,506,367 B1* | 3/2009 | Ishibashi | 726/10 |
| 2003/0039361 A1* | 2/2003 | Hawkes et al. | 380/278 |
| 2003/0088769 A1 | 5/2003 | Quick | |
| 2004/0236964 A1* | 11/2004 | Haverinen | 713/201 |
| 2005/0021985 A1 | 1/2005 | Ono et al. | |
| 2005/0111666 A1 | 5/2005 | Blom | |
| 2005/0220039 A1* | 10/2005 | Hoshino et al. | 370/261 |
| 2005/0232429 A1 | 10/2005 | Chowdhury | |
| 2005/0273843 A1* | 12/2005 | Shigeeda | 726/5 |
| 2006/0143132 A1* | 6/2006 | Valenti et al. | 705/57 |
| 2007/0064936 A1* | 3/2007 | Kasahara et al. | 380/45 |
| 2007/0203839 A1* | 8/2007 | Terauchi et al. | 705/51 |
| 2009/0235303 A1* | 9/2009 | Yamaoka et al. | 725/31 |
| 2009/0288125 A1* | 11/2009 | Morioka | 725/110 |

FOREIGN PATENT DOCUMENTS

| | | |
|---|---|---|
| JP | 7295800 A | 11/1995 |
| JP | 2004248232 A | 9/2004 |

OTHER PUBLICATIONS

3GPP TS 33.210 V7.0.0 (Dec. 2005), Technical Specification Group Services and System Aspects; 3G Security, Network Domain security; IP network layer security (Release 7).

Handley M. et al., SIP: Session Initiation Protocol; Network Working Group, Request for Comments: 2543, Mar. 1999.

J. Rosenberg et al., SIP: Session Initiation Protocol; Network Working Group, Request for Comments: 3261, Jun. 2002.

Handley M. et al., SDP: Session Description Protocol; Network Working Group, Request for Comments: 2327, Apr. 1998.

J. Arkko, Mikey: Multimedia Internet KEYing; Network Working Group, Request for Comments: 3830, Aug. 2004.

"Digital Cellular Telecommunications System (Phase 2+)", Dec. 2005, ETSI Standards, European Telecommunications Standards Institute, Sophia-Antipo, FR, XP014032881, ISSN: 0000-0001.

* cited by examiner

METHOD, DEVICES AND COMPUTER PROGRAM PRODUCT FOR ENCODING AND DECODING MEDIA DATA

The invention relates to methods for encoding and decoding media data in a communication system. The invention also relates to a subscriber device and a control server as parts of a communication system, and to a computer program product by means of which the method can be carried out.

With the increasing spread of broadband mobile radio networks, e.g. UMTS (Universal Mobile Telecommunications System), the so-called Third Generation Partnership Project (3GPP) has developed a number of standards for integrating voice and Internet services under the name of IP multimedia subsystem (IMS). The IMS standards are intended to promote the fusion of packet- and circuit-switched networks, particularly in the mobile domain. However, IMS systems are also suitable for transmitting media data in fixed networks, for example via public telephone networks or the Internet.

In mobile radio networks according to the 3GPP UMTS Terrestrial Radio Access Network (UTRAN) standard, data are encoded on one of the lower transmission levels of the network protocol, e.g. in the data link layer. For this reason, the IMS Access Security (3GPP TS 33.203) and Network Domain Security (3GPP TS 33.210) standards do not provide separate encoding of media data. However, such encoding of transmitted data does not take place in fixed networks.

Encoding of media data is often desired, however. This is because, on the one hand, networks based on the Internet protocol (IP), in particular are notoriously insecure, so that, for example, video telephone conversations which are conducted at least partially via such networks can be tapped relatively easily. On the other hand, media data are often offered as so-called chargeable value-added services such as, for example, video on demand. Here, too, it must be ensured that the transmitted media data are utilized only by the legal receiver.

A standard for the secure transmission of media data between two subscribers is known, for example, from the Secure Realtime Transport Protocol (SRTP, corresponding to RFC 3711). However, a data transmission according to the SRTP standard cannot be used, in particular, in heterogeneous networks since technical problems in the conversion of encrypted data streams sometimes occur at network boundaries, for example on the transition from the Internet to public telephone networks.

It is the object of the invention, therefore, to describe methods and devices of a communication system in which an encoding of media data for the transmission in a media network is possible in a simple and secure manner.

The object is achieved by the features of the independent patent claims. Advantageous embodiments of the invention are characterized in the respective dependent claims.

According to a first aspect, the invention is distinguished by a method for encoding and decoding media data which has the following steps: a request is transmitted from a subscriber device via a control network to a control server for specifying a set of encoding parameters for control data. In this context, the request comprises identification data of the subscriber device. The control server thereupon specifies the set of encoding parameters for the control data comprising a random number, a control data key and an integrity key, wherein the control data key and the integrity key are dependent on the random number and the identification data. A media key dependent on the control data key and on the integrity key is then generated via the control server and transmitted via a core network to a media server. Uncoded media data are then coded by the media server by using the media key for sending via a data network to the subscriber device and/or coded media data received via the data network and sent by a subscriber device are decoded by the media server by using the media key.

For the encoding of the control data, it is indispensable in a communication system to negotiate the control data key and possibly additionally the integrity key between the subscriber device and the control server. Due to the fact that the media key is determined from these keys already known, an additional negotiation of the media key can be dispensed with. Advantageously, network traffic and computer power are thus reduced which, for example, would be required for authenticating the subscriber device to the control server in the case of separate negotiation of the media key.

According to an advantageous embodiment of the first aspect, in addition to the media key further encoding parameters, particularly relating to the encoding algorithm to be used, are transmitted from the control server via the core network to the media server. In this manner, the method can be used universally in various encoding contexts.

The further encoding parameters are then advantageously specified either previously by the subscriber device and transmitted to the control server or negotiated between the subscriber device and the control server. The result is that suitable encoding parameters, that is to say, e.g. a suitable encoding algorithm known to both sides, is used for both sides, subscriber device and control server or media server, respectively.

According to a second aspect, the object is also achieved by a method in which, analogously to the first aspect, a request is transmitted from a subscriber device via a control network to a control server for specifying a set of encoding parameters for control data. Of the set of encoding parameters generated thereupon, a random number is sent back to the subscriber device. By means of identification data and the random number, the subscriber device generates a control data key and an integrity key. Following this, a media key is generated by the subscriber device in dependence on the control data key and the integrity key. Coded media data sent by a media server and received via the data network are then decoded by the subscriber device by using the media key and/or uncoded media data are encoded by the subscriber device by using the media key for sending via a data network to the media server. The resultant advantages correspond to those of the first aspect.

According to further advantageous embodiments of the invention, the media key is formed either by an exclusive-OR operation (XOR) or with the aid of a one-way hash function from the control data key and the integrity key. Both are functions which are simple to implement and offer the advantageous security aspect that it is not possible to deduce the control data key and the integrity key from the media key. When the one-way hash function is used, the third key cannot be determined even when the media key and one of the two other keys are known.

According to further advantageous embodiments of the invention, the media key is used either directly for encoding and decoding or a further key which is used for encoding and decoding is determined in dependence on the media key.

According to a third aspect, the object is also achieved by a control server of a communication system having a first interface to a control network and a second interface to a core network. In this arrangement, the control server can be connected to a subscriber device via the first interface and the control network and to a media server via the second interface and the core network. The control server is set up for receiving identification data from the subscriber device and specifying a set of encoding parameters for control data. In this context, the encoding parameters comprise a random number and, in dependence on the random number and the identification data, a control data key and an integrity key. The control server is also set up for generating, and transmitting to the media server via the core network, a media key in dependence on the control data key and the integrity key.

Analogously, the object is achieved, according to a fourth aspect, by a subscriber device for use in a communication system having a first interface to a control network and a second interface to a media network. In this context, the subscriber device can be connected to a control server via the first interface and the control network for exchanging control data and to a media server via the second interface and the media network for exchanging media data. The subscriber device is set up for sending identification data to the control server, receiving a random number as response and generating a control data key and an integrity key in dependence on the random number and the identification data, the control data key and the integrity key being used for encoding and decoding the control data. The subscriber device is also set up for generating a media key in dependence on the control data key and the integrity key, wherein the media key is used for encoding and decoding the media data.

According to a fifth aspect, the object is achieved by a computer program product with program code for executing a computer program on one or more computers of a communication system, one of the methods specified being carried out during the execution of the program code.

Similar to the computer program product, the control server and the subscriber device enable the methods according to the invention to be carried out. The resultant advantages of the third, fourth and fifth aspects therefore correspond to those of the first and second aspects.

Figure 2:
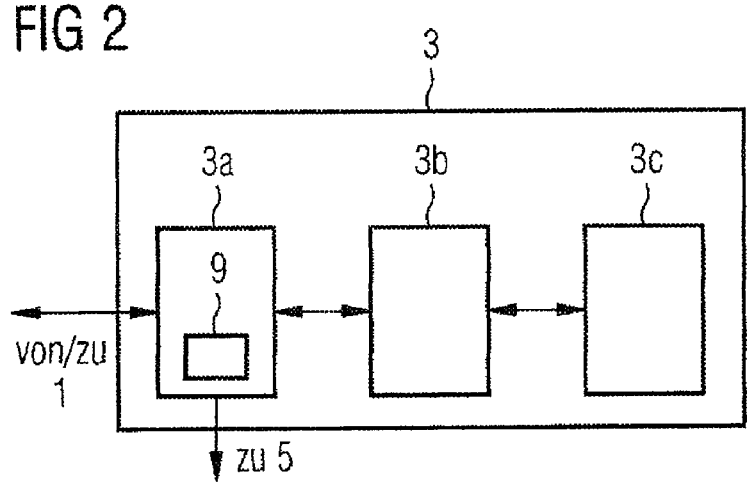
Figure 3:
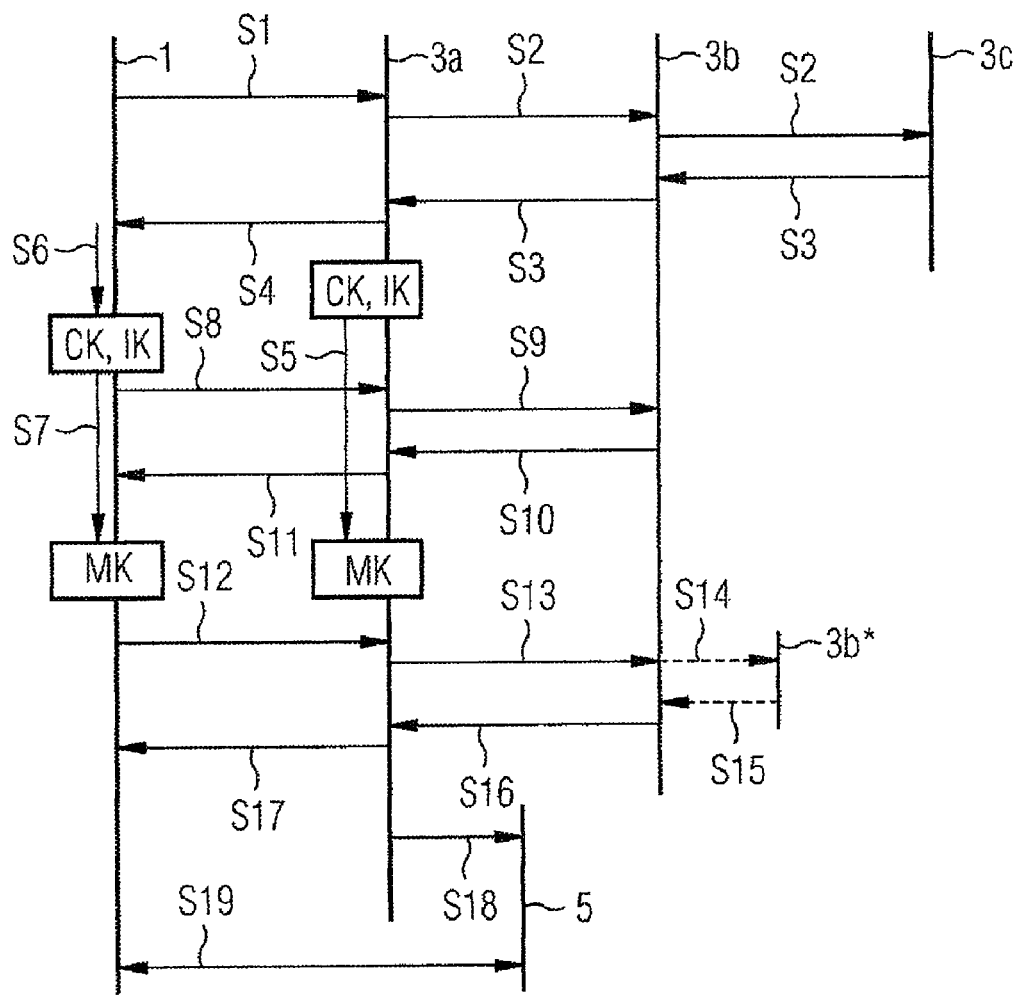

In the text which follows, the invention will be explained in greater detail by means of exemplary embodiments, with the aid of three figures, in which:

FIG. 1 shows a communication system with a subscriber device, a control server and a media server, FIG. 2 shows an embodiment of a control server, and FIG. 3 shows a sequence diagram of a connection set-up and a subsequent transmission of encoded media data from a media server to a subscriber device.

FIG. 1 shows a communication system having a subscriber device 1 with identification data ID, which is connected to a control server 3 via a control network 2. For example, the identification data ID and a random number R can be transmitted via the control network 2. The control server 3 has encoding parameters K which comprise a control data key CK, an integrity key IK and the random number R. The control server 3 is connected via a core network 4 via which a media key MD is transmitted, to a media server 5 which has uncoded media data MD. The media server 5 in turn, is connected to the subscriber device 1 via a data network 6 via which encoded media data CMD are transmitted. Control server 3, core network 4 and media server 5 form a switching center 7 or are part thereof. Control network 2 and data network 6 together form an access network 8. The subscriber device 1 and the control server 3 have a media code generator 9.

The arrangement shown in FIG. 1 represents an excerpt from a communication system. For the sake of simplicity, only one subscriber device 1 is shown, usually a multiplicity of subscriber devices is present which are in each case connected to the switching center 7 via an access network. As well, several switching centers can be provided in a communication network, wherein a first group of subscriber devices is connected to a first switching center and a second group of subscriber devices is connected to a second switching center. In such a case, the individual switching centers are typically connected both via their control servers and via their media servers. However, it is also conceivable that a number of switching centers having in each case their own control server use a common media server. The connection between different switching centers can be made via a network corresponding to the core network 4. As an alternative, the core network 4 can be extended spread in and between several switching centers.

A communication system of the type described is suitable for transmitting data and/or telephone calls (coded as data) via two subscriber devices, that is to say, e.g. the subscriber device 1 shown and a further subscriber device, not shown, via the media servers 5 and possibly other media servers. Similarly, it is possible that the subscriber device 1, without involvement of another subscriber device, receives data from the media server 5 or exchanges data with it. Such a case occurs, for example, when services such as video-on-demand are used.

The access network 8 can be, for example, a line-connected public telephone network such as, e.g., an analog telephone network or an ISDN (Integrated Services Digital Network) telephone network. Further access networks can be, for example, wireless mobile radio networks such as, e.g. GSM (Global System for Mobile Communication) or UMTS networks. The core network 4 is, for example, a data network according to the Internet protocol which is used by a provider of communication services for transmitting data in or between switching centers.

In the access network 8, control data are transmitted via the control network 2 and payload data are transmitted via the media network 6. In this arrangement, the control network 2 and the media network 6 can be physically separate networks or also logically separated networks of one and the same physical network. For example, they are only logically separated networks if control and payload data are exchanged by different protocol levels on a single transmission channel between the switching center 7 and the subscriber device 1. However, they can also be separate transmission channels such as, for example, a so-called ISDN control channel D and a so-called ISDN data channel B.

If the access network 8 is a line-connected telephone network, in particular, payload data should not be exchanged uncoded between subscriber device 1 and media server 5. For this purpose, the encoding and decoding units 10 in the subscriber device 1 and in the media server 5 are known from the prior art. The encoding and decoding units 10 can encode payload data, e.g. the media data MD on the media server 5 and transmit them as coded media data CMD to the subscriber device 1 via the media network 6.

The encoding and decoding unit 10 of the subscriber device 1 can decode the received coded media data CMD again for utilization. Since typically a symmetric encryption is used, the two encoding and decoding units 10 must have the same key. According to the invention, the media key MK is provided for this purpose to the encoding and decoding units 10 by the media key generators 9.

If a radio network is used as access network, payload data would not need to be encoded for the transmission since coding is already used at the security level of the network protocol. Nevertheless, the method according to the invention can also be applied in an access network which uses a network protocol with coded transmission.

The control server 3 has a task in initiating, controlling and checking the connection set-up between the subscriber device 1 and the switching center 7. In FIG. 2, the structure of a control server 3 is shown in greater detail in an exemplary embodiment. The control server 3 comprises several functional components which are set up for processing various tasks of the control server 3, namely a contact server 3a, a session server 3b and a subscriber server 3c. The media key generator 9 is provided inside the contact server 3a. The contact server 3a also provides the connections to the subscriber device 1 and to the media server 7.

All three components of the control server 3 are usually software-implemented, wherein the components can be executed both on a common hardware unit and on separate hardware units. Separate hardware units can also be spatially separated, using a network similar to the core network 4 for exchanging data.

The structure of a contact server 3, shown in FIG. 2, is typical of an IP multimedia subsystem according to 3GPP standards. In such a system, the contact server 3a is called Proxy Call Session Control Function (P-CSCF), the session server 3b is called Serving Call Session Control Function (S-CSCF) and the subscriber server 3c is called Home Subscriber Server (HSS).

The operation of the individual components, contact server 3a, session server 3b and subscriber server 3c, and thus also the operation of the control server 3 and the media key generators 9 will be explained in greater detail in conjunction with FIG. 3 in the text which follows.

FIG. 3 shows a sequence chart of a connection set-up and a subsequent transmission of coded media data CMD between the media server 5 and the subscriber device 1. The contact server 3a, the session server 3b and the subscriber server 3c are involved in the connection set-up.

In a first step S1, the subscriber device 1 makes a request for connection set-up, also called "sub-registration" request, to the contact server 3a of the control server 3. In an IMS according to the 3GPP standard in which the contact server is called Proxy Call Session Control Function (P-CSCF), for example, the so-called Session Initiation Protocol (SIP, corresponding to RFC 3261 and RFC 2543) can be used in connection with the Session Description Protocol (SDP, corresponding to RFC 2327), as Session Initiation Protocol. In the request in step S1, in particular, the identification data ID unambiguously identifying the subscriber device 1 are transmitted. These identification data ID are stored, for example, on the so-called SIM (Subscriber Identity Module) card in mobile telephones. The identification data ID will be subsequently needed for determining the set of encoding parameters K which are used for encoding the further exchange of control data between the subscriber device 1 and the control server 3.

To transmit information during the determination of the set of encoding parameters K, the multimedia Internet KEYing (MIKEY) protocol (corresponding to RFC 3830) within the SIP protocol can be used, for example. Similarly, the transmission could take place in accordance with the security descriptions (SDES, corresponding to a draft of the IETF—Internet Engineering Task Force).

In a second step S2, the identification data ID are forwarded from the contact server 3a via the session server 3b to the subscriber server 3c. The session server 3b (in a 3GPP system, the S-CSCF, possibly with the support of a so-called Interrogating Call Session Control Function I-CSCF) is used for securing the session data, e.g. for accountancy purposes, and is only of marginal significance in the context shown here. The subscriber server 3c has a database (or has access to one) in which the identification data ID of subscriber devices are stored. The subscriber server 3c (home subscriber server in a 3GPP system) determines the random number R and by using the random number R, determines the control data key CK and the integrity key IK in dependence on the identification data ID. For security reasons, it is not the identification data ID directly but a sequence of numbers or characters allocated to the identification data ID in the database which is used for determining the keys. Methods and algorithms for key generation which can be used are known in this case from corresponding specifications of the 3GPP system. The set of encoding parameters K is formed by random number R, the control data key CK and the integrity key IK.

This set of encoding parameters K, in turn, is sent to the contact server 3a via the session server 3b by the subscriber server 3c in a step S3. The control data key CK and the integrity key IK are thus now available to the contact server 3a for encoding control data which are exchanged with the subscriber device 1. The control data key CK is used for the actual encoding with a symmetric encoding algorithm. Sequences coded with the integrity key IK sent out additionally with the control data allow the integrity of the control data to be checked and any attempts at manipulation to be detected. According to 3GPP, both keys have a length of 128 bits.

In a step S4, the random number R of the set of encoding parameters K is sent (uncoded) to the subscriber device 1. The keys CK and IK are not transmitted for security reasons but generated by the subscriber device 1 itself as described further below.

Furthermore, the contact server 3a determines the media key MK from the control data key CK and the integrity key IK in a step S5. For example, the media key MK can be calculated via an exclusive-OR combination (XOR) of the two keys CK and IK. This is available in 3GPP, particularly because the two keys CK and IK have the same length. As an alternative, it is possible, e.g. to determine the media key MK via an irreversibly unambiguous mapping from the two keys CK and IK. Such mapping is also called one-way hash function. One-way hash functions which can be used are known, for example, as messenger digest (MD4, MD5) or secure hash algorithm (SHA). One-way hash functions have the advantage that from a media key MK which has become known, no conclusions can be drawn regarding the basic keys CK and IK. In principle, however, any other function from which a key sequence can be calculated from one or both of the keys CK and IK is suitable for calculating the media key MK. In this context, the length of the resultant media key MK does not need to correspond to the keys CK and IK used. Furthermore, additional parameters can flow into the determination of the media key MK via the keys CK and IK. The prerequisite is here only that both the subscriber device 1 and the contact server 3a have these parameters. Examples of such parameters are the random number R or the identification data ID.

Once the subscriber device 1 has received the random number conveyed in step S4, the subscriber device determines the control data key CK and the integrity key IK in dependence on the identification data ID from the random number R in a step S6. This is carried out in the same manner as in the subscriber server 3c so that identical keys IK and CK are available in the control server 3 and in the subscriber device 1. The sequence of numbers or characters used instead of the identification data ID for determining the keys for security reasons is usually stored in the SIM card in the subscriber device.

Analogously to step S5, the media key MK is now generated from the keys CK and IK in the subscriber device 1 in a step S7.

Using a random number R, the subscriber device 1 also determines an authentication response with which a second request is sent to the contact server 3a, e.g. via the Session Initiation Protocol (SIP) as the next stage in the connection set-up in a step S8.

This second request is forwarded in a step S9 to the session server 3b which checks the authentication response of the subscriber device 1 and, in the case of a positive result, registers the session as successfully opened and sends an acknowledgement sequence back to the contact server 3a in a step S10. Similar to the Hypertext Transport Protocol (HTTP), a status message "200 OK" is used as positive acknowledgement also in the SIP. In a step S11, the acknowledgement sequence is forwarded to the subscriber device 1.

At this point, the connection and session set-up is concluded and the transmission of payload data can be initiated. For the method, it is assumed that the determination of the media key MK in steps S5 and S7 is also concluded both in the contact server 3a and in the subscriber device 1 at this point.

In a step S12, the subscriber device 1 makes a request for conveying the required media data to the contact server 3a. In the Session Initiation Protocol (SIP), the "invite" sequence is provided for such a request, by means of which media data MD can be called up by the media server 5, wherein the data can both be already present on the media server 5 or can be call data which are to be exchanged with a further subscriber device via the media server 5. In the SIP protocol, it is provided that an encryption context which, for example, specifies the encoding algorithm to be used, can be sent with the request. The encryption context does not comprise the media key MK even if this were possible in accordance with the SIP protocol since the media key MK is already present in the control server 3 in the method according to the invention.

In a step S13, the "invite" request is forwarded by the contact server 3a to the session server 3b, but without encryption context. The session server 3b logs the request and determines whether the request is admissible, that is to say, for example, whether the subscriber device 1 is authorized for access to the requested media data MD, or not. If the request is admissible, the session server 3b sends back the status message "200 OK" as positive acknowledgement to the contact server 3a in a step S16. If it is not media data MD which are already present which have been requested but a call to a further subscriber device, the session server 3b, after step S13, first contacts in a step S14 a corresponding session server 3b * which is responsible for the further subscriber device.

In a step S15, the session server 3b receives a status message from the counterpart as response which is then forwarded in step S16.

Once the contact server 3a has received the return message from the session server 3b, it sends the received status message to the subscriber device 1 in a step S18.

If the request was admissible and the return message positive, the contact server 3a conveys both the encryption context and the media key MK to the media server 5 in a step S18. In addition, further information is transmitted which identifies the media data MD to be conveyed. Since this transfer takes place via the core network 4 which is generally not public, no further security measures for protecting the media key MK are required here, in principle. If an additional security measure is desired or if the core network 4 should still be wholly or partially public, the transfer can naturally also be encrypted.

The media server 5 thereupon encodes the media data MD with the media key MK in the requested encryption context, i.e., for example, by using the specified encoding algorithm. The coded media data CMD obtained are sent to the subscriber device 1 in a final step S19.

Since the media network 6 is usually packet-switched, it makes sense to initially not code the media data MD as a whole and then to transmit it packet by packet but in each case to code the individual packets. In the subscriber device 1, the received coded media data CMD can be decoded since the encryption context (predetermined by itself) and also the media key MK needed (calculated in step S7) are available to the subscriber device 1.

During the transmission of the coded media data CMD, other control data can already be exchanged between the subscriber device 1 and the control server 3 parallel in time. These control data can be used, e.g. for checking the correct processing of the transmission or also relate to other requests. This can involve the negotiation of new keys CK and IK. It is advantageous also to recalculate the media key MK in such a case since, the shorter the time for which the same key is used, the more secure is an encryption mechanism. However, synchronization problems can arise with a newly calculated media key MK if the new key is not available simultaneously to the media server 5 and the subscriber device 1. In such a case, however, error correction and treatment mechanisms already known and provided in the 3GPP system become active. A packet coded by the media server 5 with a media key MK not available to the subscriber device 1 would be graded as corrupt by the subscriber device 1 and either discarded (in the case of call data) or requested again from the control server 3a by the subscriber device 1.

The invention claimed is:

1. A method for encoding and decoding media data, having the steps:
    transmitting a request from a subscriber device via a control network to a control server for specifying a set of encoding parameters for control data, the request comprising identification data of the subscriber device,
    specifying the set of encoding parameters for control data by the control server, comprising a random number, a control data key and an integrity key, the control data key and the integrity key being dependent on the random number and the identification data,
    generating a media key in dependence on the control data key and the integrity key via the control server,
    transmitting the media key from the control server to a media server via a core network,
    transmitting further encoding parameters relating to an encoding algorithm to be used, from the control server via the core network to the media server, the further encoding parameters being negotiated between the subscriber device and the control server,
    encoding uncoded media data by the media server using the media key for sending via a data network to the subscriber device, and
    decoding coded media data received via the data network and sent by the subscriber device, by the media server by using the media key.

2. The method as claimed in claim 1, in which the further encoding parameters are previously specified by the subscriber device and transmitted to the control server.

3. The method as claimed in claim 1, in which the media key is formed by an exclusive-OR combination from the control data key and the integrity key.

4. The method as claimed in claim 1, in which the media key is formed from the control data key and the integrity key by a one-way hash function.

5. The method as claimed in claim 1, in which the media key is used directly for encoding and decoding.

6. The method as claimed in claim 1, in which a further key which is used for encoding and decoding is determined in dependence on the media key.

7. A method for encoding and decoding media data, having the steps:
- transmitting a request from a subscriber device via a control network to a control server for specifying a set of encoding parameters for control data, therequest comprising identification data of the subscriber device,
- specifying the set of encoding parameters for control data by the control server, comprising a random number,
- transmitting the random number from the control server to the subscriber device,
- determining a control data key and an integrity key in dependence on the random number and the identification data via the subscriber device,
- generating a media key in dependence on the control data key and the integrity key via the subscriber device,
- transmitting further encoding parameters relating to an encoding algorithm to be used, from the control server via the core network to a media server, the further encoding parameters being negotiated between the subscriber device and the control server,
- decoding coded media data received via a data network and sent by the media server, by the subscriber device by using the media key, and
- encoding uncoded media data by the subscriber device by using the media key for sending to the media server via the data network.

8. A control server of a communication system, comprising:
- a first interface to a control network,
- a second interface to a core network, wherein
- the control server can be connected to a subscriber device via the first interface and the control network and to a media server via the second interface and the core network, and wherein the control server is set up for:
- receiving identification data from the subscriber device,
- specifying a set of encoding parameters for control data, the encoding parameters comprising a random number and, in dependence on the random number and the identification data, a control data key and an integrity key,
- generating a media key in dependence on the control data key and the integrity key,
- transmitting the media key to the media server via the core network,
- decoding coded media data received in a data network and sent by the media server, by the subscriber device by using the media key, and
- transmitting further encoding parameters relating to an encoding algorithm to be used, from the control server via the core network to the media server, the further encoding parameters being negotiated between the subscriber device and the control server.

9. A subscriber device for use in a communication system, comprising:
- a first interface to a control network,
- a second interface to a media network, wherein
- the subscriber device can be connected to a control server via the first interface and the control network for exchanging control data and to a media server via the second interface and the media network for exchanging media data, and
- wherein the subscriber device is set up for:
- sending identification data to the control server,
- receiving a random number as response,
- generating a control data key and an integrity key in dependence on the random number and the identification data, the control data key and the integrity key being used for encoding and decoding the control data, and generating a media key in dependence on the control data key and the integrity key, the media key being used for encoding and decoding the media data,
- decoding coded media data received in a data network and sent by the media server, by the subscriber device by using the media key, and
- transmitting further encoding parameters relating to an encoding algorithm to be used, from the control server via the core network to the media server, the further encoding parameters being negotiated between the subscriber device and the control server.

* * * * *